United States Patent Office 3,082,251
Patented Mar. 19, 1963

3,082,251
PROCESS OF MANUFACTURING BRANCHED-CHAIN MONO-OLEFINIC ALIPHATIC ACIDS AND INTERMEDIATES THEREFOR
Kent C. Brannock, Kingsport, Tenn., assignor to Eastman Kodak Company, Rochester, N.Y., a corporation of New Jersey
No Drawing. Filed Aug. 22, 1960, Ser. No. 50,830
6 Claims. (Cl. 260—526)

This invention relates to the manufacture of branched-chain mono-olefinic aliphatic acids, and to intermediates therefor.

I have found that when an enamine of the type

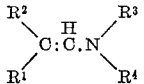

in which $R^1$ and $R^2$ are alkyl groups, and $R^3$ and $R^4$ are alkyl groups, or hydrocarbon groups which together with the nitrogen atom to which they are attached form a fully hydrogenated ring, is allowed to react with an acetylenic compound of the type X.C⋮C.Y, in which X is hydrogen or a carbalkoxy group and Y is a carbalkoxy group, a carbon skeletal rearrangement occurs and a compound is formed having the structure

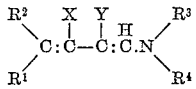

in which $R^1$, $R^2$, $R^3$, $R^4$, X and Y have the same significance as above. Treatment of this compound with hydrochloric acid results in hydrolysis of the dialkylamino group, giving a compound

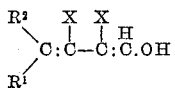

which, in turn, can be hydrolyzed with an alkali metal hydroxide, such as sodium hydroxide, which replaces the hydroxymethylene group by two hydrogen atoms and saponifies the ester group or groups giving a compound

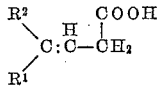

or

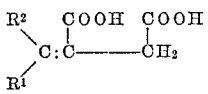

depending upon whether X was hydrogen or carbalkoxy.

My invention is illustrated, but not limited, by the following examples.

Example 1

Over a 15-minute period, 50 grams of N,N-dimethylisobutenylamine was added to 50 grams of ethyl propiolate with intermittent cooling to maintain the temperature at 40–50° C. The mixture was allowed to stand an additional three hours with occasional cooling to maintain the temperature at 30–45° C. Heat was evolved slowly during this period. After three hours, no more heat was evolved and the mixture was allowed to stand over night. Distillation of the mixture then gave 47 grams of ethyl 2-dimethylaminomethylene-4-methyl-3-pentenoate (47% yield), boiling point 92–95° C. at ca. 1 mm., $n_D^{20}$ 1.5219; an intermediate fraction of 7.5 grams, boiling point 95–135° C.; and 21.5 grams of a product from two moles of ethyl propiolate and one mole of the enamine, boiling point 135–137° C. at ca. 1 mm., $n_D^{20}$ 1.4949. The latter product is probably a Diels-Alder adduct derived from ethyl propiolate and ethyl 2-dimethylaminomethylene-4-methyl-3-pentenoate.

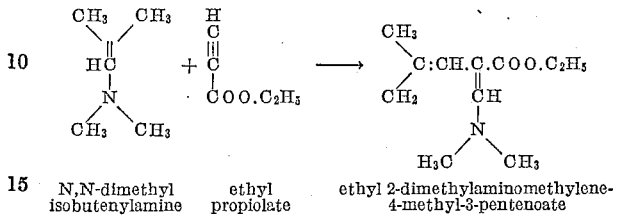

N,N-dimethyl   ethyl   ethyl 2-dimethylaminomethylene-
isobutenylamine  propiolate   4-methyl-3-pentenoate

Example 2

In like manner, methyl propiolate and N,N-dimethylisobutenylamine gave methyl 2-dimethylaminomethylene-4-methyl-3-pentenoate, boiling point 88° C. at 1 mm., $n_D^{20}$ 1.5297, in 50% yield.

Treatment of 56 grams of methyl 2-dimethylaminomethylene-4-methyl-3-pentenoate with a solution of 130 ml. of concentrated hydrochloric acid in 700 ml. of water for three hours at room temperature resulted in hydrolysis of the dimethylaminomethylene group. Work-up of the mixture gave 40 grams (83% yield) of methyl 2-hydroxymethylene-4-methyl-3-pentenoate, boiling point 50–53° C. at 2 mm., $n_D^{20}$ 1.4808. Hydrolysis of the latter compound with aqueous sodium hydroxide gave a 74% yield of 4-methyl-3-pentenoic acid.

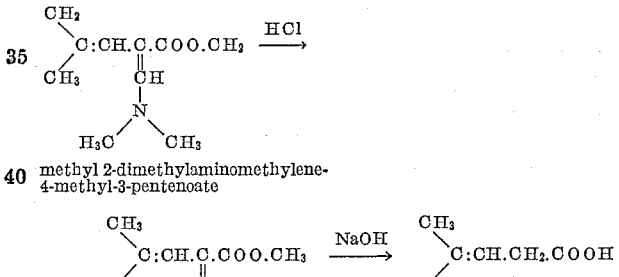

methyl 2-dimethylaminomethylene-4-methyl-3-pentenoate methyl 2-hydroxymethylene-   4-methyl-3-pentenoic acid
4-methyl-3-pentenoate         (pyroterebic acid)

Example 3

To a solution of 120 grams (1.2 moles) of N,N-dimethyl isobutenylamine in 150 ml. of ether, 170 grams (1 mole) of diethyl acetylenedicarboxylate was added over a two hour period at a rate such as to maintain gentle reflux (44–50° C.). The reaction mixture temperature dropped slowly to room temperature over the next hour. The mixture was allowed to stand over night. The ether and excess enamine were removed by distillation in vacuo, and the residue crystallized. A small amount of hexane was added, and the solid was filtered off to give an essentially quantitative yield of crude diethyl 2-dimethylaminomethylene-3-isopropylidene succinate. Recrystallization from hexane gave 196 grams (73% yield) of the pure compound.

This ester was carried through transformations similar to those described in Example 2, to give diethyl 2-hydroxymethylene-3-isopropylidene succinate, boiling point 110–112° C. at 3 mm., $n_D^{20}$ 1.4805, in 70% yield. The latter in turn gave teraconic acid in 97% yield. The teraconic acid gave isopropyl succinic acid in excellent yield on hydogenation.

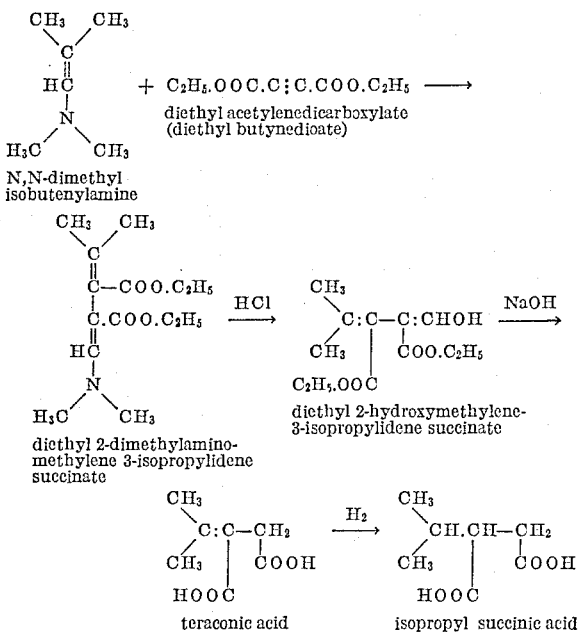

Example 4

In a manner similar to that described in Example 3, 1-piperidino-1-isobutene and dimethyl acetylenedicarboxylate (dimethyl butynedioate) gave dimethyl 2-piperidinomethylene-3-isopropylidene succinate, B.P. 145–155° C. at 1 mm., $n_D^{20}$ 1.5372. 1-piperidino-1-isobutene is described in Angew. Chem. 71, 521 (1959), abstracted in Chem. Abstr. 54, 6751b (1960).

$C_5H_{10}N-CH:C(CH_3)_2$ + $CH_3.OOC.C:C.COO.CH_3$ ⟶
1-piperidino-isobutene (N-isobutenyl piperidine)   dimethyl butynedioate (dimethyl acetylenedicarboxylate)

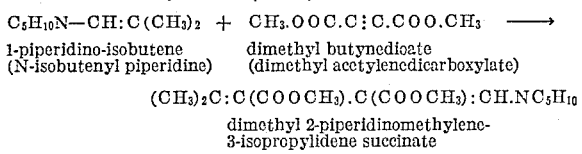
dimethyl 2-piperidinomethylene-3-isopropylidene succinate

Hydrolysis of the product by HCl gives dimethyl 2-hydroxymethylene-3-isopropylidene succinate which, on saponification, gives teraconic acid.

Example 5

In like manner, N-(2-methyl-1-butenyl) piperidine and dimethyl acetylenedicaboxylate gave dimethyl 2-piperidinomethylene-3-sec-butylidene succinate, B.P. 138–145° C. at 0.5 mm.

$C_5H_{10}N-CH:C(CH_3).CH_2.CH_3$ + $CH_3.OOC.C:C.COO.CH_3$ ⟶
N-(2-methyl-1-butenyl piperidine)    dimethyl butynedioate

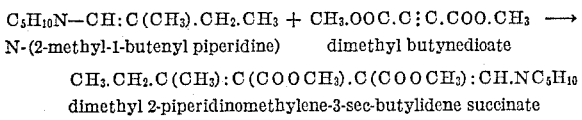
dimethyl 2-piperidinomethylene-3-sec-butylidene succinate

Hydrolysis of the product by HCl gives dimethyl 2-hydroxymethylene-3-sec-butylidene succinate which, on saponification, gives sec-butylidene succinic acid.

Example 6

In like manner N,N-dimethyl 2-ethylbutylamine and dimethyl acetylenedicarboxylate gave dimethyl 2-dimethylaminomethyl-ene-3-(3-pentylidene) succinate, B.P. 130–133° C. at 0.5 mm.

$(C_2H_5)_2CH:CH.N(CH_3)_2$ + $CH_3OOC.C:C.COOCH_3$ ⟶
N,N-dimethyl-2-ethyl-butenylamine    dimethyl butynedioate

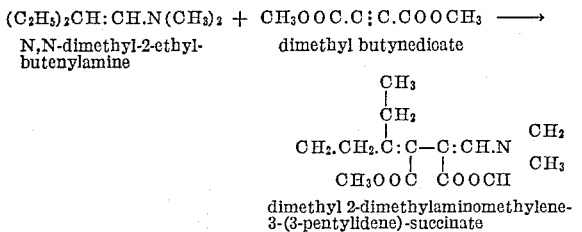
dimethyl 2-dimethylaminomethylene-3-(3-pentylidene)-succinate

Hydroylsis of the product by HCl gives dimethyl 2-hydroxymethylene-3-(3-pentylidene)-succinate which, on saponification, gives sec-3-pentylidene-succinic acid.

Utility of teraconic acid is shown in U.S. Patent 2,469,377 of Flett. 4-methyl-3-pentenoic acid is readily converted by hydrogenation to isohexanoic acid, or by treatment with mineral acid to isocaprolactone. The utility of acids and lactones of this type, as well as the utility of dibasic aliphatic acids, is well known in the art.

I claim:

1. A process of manufacturing a branched-chain mono-olefinic aliphatic acid having the structural formula

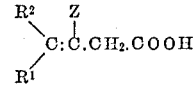 (1)

in which $R^1$ and $R^2$ are alkyl groups and Z is selected from the group consisting of hydrogen and carboxyl, which comprises allowing an enamine having the structural formula

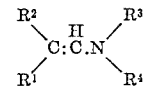 (2)

in which $R^3$ and $R^4$ are selected from the group consisting of alkyl groups and hydrocarbon groups which together with the nitrogen atom to which they are attached form a fully hydrogenated ring, to react with an acetylenic compound having the formula $$X.C:C.Y$$

in which X is selected from the group consisting of hydrogen and carbalkoxy and Y is carbalkoxy, to give a compound having the structural formula

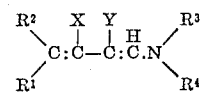 (4)

hydrolyzing this compound by means of hydrochloric acid to give a compound having the structural formula

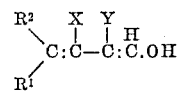 (5)

and hydrolyzing this latter compound by means of an alkali metal hydroxide to give a branched-chain mono-olefinic aliphatic acid of the structural formula shown at (1) in this claim, the significance of $R^1$, $R^2$, $R^3$, $R^4$, X and Y being constant throughout the claim.

2. A process of manufacturing 4-methyl-3-pentenoic acid which comprises allowing N,N-dimethyl isobutenylamine to react with an alkyl ester of propiolic acid to give the corresponding alkyl ester of 2-dimethylaminomethyl-ene-4-methyl-3-pentenoic acid, hydrolyzing this alkyl ester of 2-dimethylaminomethylene-4-methyl-3-pentenoic acid by means of hydrochloric acid to give the corresponding alkyl ester of 2-hydroxymethylene-4-methyl-3-pentenoic acid, and hydrolyzing the latter compound by means of an alkali metal hydroxide to give 4-methyl-3-pentenoic acid.

3. A process of manufacturing teraconic acid which comprises allowing N,N-dimethyl isobutenylamine to react with a dialkyl ester of butynedioic acid to give the corresponding dialkyl ester of 2-dimethylaminomethylene-3-isopropylidene succinic acid, hydrolyzing this dialkyl ester of 2-dimethylaminomethylene-3-isopropylidene succinic acid by means of hydrochloric acid to give the corresponding dialkyl ester of 2-hydroxymethylene-3-isopropylidene succinic acid, and hydrolyzing the latter compound by means of an alkali metal hydroxide to give teraconic acid.

4. A process of manufacturing teraconic acid which comprises allowing 1-piperidino-1-isobutene to react with a dialkyl ester of butynedioic acid to give the corresponding dialkyl ester of 2-piperidinomethylene-3-isopropylidene succinic acid, hydrolyzing this dialkyl ester of 2-piperidinomethylene-3-isopropylidene succinic acid by means of hydrochloric acid to give the corresponding dialkyl ester of 2-hydroxymethylene-3-isopropylidene succinic acid, and hydrolyzing the latter compound by means of an alkali metal hydroxide to give teraconic acid.

5. A process of manufacturing sec-butylidene succinic acid which comprises allowing N-(2-methyl-1-butenyl) piperidine to react with a dialkyl ester of butynedioic acid to give the corresponding dialkyl ester of 2-piperidinomethylene-3-sec-butylidene succinic acid, hydrolyzing this dialkyl ester of 2-piperidinomethylene-3-sec-butylidene succinic acid by means of hydrochloric acid to give the corresponding dialkyl ester of 2-hydroxymethylene-3-sec-butylidene succinic acid, and hydrolyzing the latter compound by means of an alkali metal hydroxide to give sec-butylidene succinic acid.

6. A process of manufacturing sec-3-pentylidene-succinic acid which comprises allowing N,N-dimethyl-2-ethyl-butenylamine to react with a dialkyl ester of butynedioic acid to give the corresponding dialkyl ester of 2-dimethyl-aminomethylene-3-(3-pentylidene)-succinic acid, hydrolyzing this dialkyl ester of 2-dimethylaminomethylene-3-(3-pentylidene)-succinic acid by means of hydrochloric acid to give the corresponding dialkyl ester of 2-hydroxymethylene-3-(3-pentylidene)-succinic acid, and hydrolyzing the latter compound by means of an alkali metal hydroxide to give sec-3-pentylidene-succinic acid.

No references cited.